(12) United States Patent
Dooley et al.

(10) Patent No.: US 9,267,438 B2
(45) Date of Patent: Feb. 23, 2016

(54) STARTING OF AIRCRAFT ENGINE

(75) Inventors: Kevin Allan Dooley, Toronto (CA);
Keith Morgan, Westmount (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 819 days.

(21) Appl. No.: 13/270,487

(22) Filed: Oct. 11, 2011

(65) Prior Publication Data
US 2013/0086919 A1  Apr. 11, 2013

(51) Int. Cl.
*F02C 7/26* (2006.01)
*F02C 7/275* (2006.01)
*F02C 7/268* (2006.01)
*F02N 11/04* (2006.01)
*F02N 11/08* (2006.01)

(52) U.S. Cl.
CPC .............. *F02C 7/26* (2013.01); *F02N 11/0866* (2013.01); *F02C 7/268* (2013.01); *F02N 11/04* (2013.01); *F02N 11/0844* (2013.01); *Y02T 50/671* (2013.01)

(58) Field of Classification Search
CPC ............ F02C 7/26; F02C 7/268; F02C 7/275; F02N 11/006; F02N 11/04; F02N 11/0844; F02N 11/0866
USPC .......................................... 60/778, 786, 788
See application file for complete search history.

(56) References Cited

U.S. PATENT DOCUMENTS

| | | |
|---|---|---|
| 2,723,531 A | 11/1955 | Wosika et al. |
| 3,591,843 A | 7/1971 | Friedrich |
| 3,869,862 A | 3/1975 | Dickey |
| 3,930,366 A | 1/1976 | Nelson |
| 3,938,320 A | 2/1976 | Nelson |
| 3,983,693 A | 10/1976 | Werner |
| 4,147,035 A | 4/1979 | Moore et al. |
| 4,254,619 A | 3/1981 | Giffin, III et al. |
| 4,414,804 A | 11/1983 | Menard et al. |
| 5,309,029 A | 5/1994 | Gregory et al. |
| 5,331,935 A * | 7/1994 | Daino ....................... 123/406.76 |
| 5,343,778 A | 9/1994 | Romero et al. |
| 5,419,112 A | 5/1995 | Farrell |
| 5,546,742 A | 8/1996 | Shekhawat et al. |

(Continued)

FOREIGN PATENT DOCUMENTS

WO  2012059671 A2  5/2012

OTHER PUBLICATIONS

Dubois, "Helitech 2011: Turbomeca Unveils Leads to Less Fuel-thirsty Engines", Aviation International News, Novembre 2011, [online], retrieved from http://www.ainonline.com/?q=aviation-news/aviation-international-news/2011-11-01/helitech.

*Primary Examiner* — Arun Goyal
(74) *Attorney, Agent, or Firm* — Norton Rose Fullbright Canada LLP

(57) ABSTRACT

A multi-engine system 10 for use on an aircraft 14 is disclosed. The system 10 may comprise a first aircraft engine 16A and a second aircraft engine 16B configured to drive at least one device 12 of the aircraft 14. A starter 20 may be coupled to one of the first and second aircraft engines 16A, 16B to assist starting of the one of the first and second aircraft engines 16A, 16B. An energy source 24 may be configured to deliver energy to the starter 20 at a rapid rate during rapid starting of the one of the first and the second aircraft engines 16A, 16B, the rapid rate being higher than a regular rate used during regular starting of the one of the first and the second aircraft engines 16A, 16B. The energy source 24 may comprise at least one supercapacitor.

12 Claims, 2 Drawing Sheets

(56) References Cited

U.S. PATENT DOCUMENTS

| | | |
|---|---|---|
| 5,694,765 A | 12/1997 | Hield et al. |
| 5,818,115 A | 10/1998 | Nagao |
| 5,899,411 A | 5/1999 | Latos et al. |
| 6,467,725 B1 | 10/2002 | Coles et al. |
| 6,639,328 B2 | 10/2003 | Wacknov |
| 6,768,277 B2 | 7/2004 | Ichinose et al. |
| 6,895,741 B2 | 5/2005 | Rago et al. |
| 6,909,263 B2 | 6/2005 | Xu et al. |
| 6,979,979 B2 | 12/2005 | Xu et al. |
| 6,989,610 B2 | 1/2006 | Gupta et al. |
| 7,111,462 B2 | 9/2006 | Epstein |
| 7,481,062 B2 | 1/2009 | Gaines et al. |
| 7,513,119 B2 | 4/2009 | Zielinski et al. |
| 7,552,582 B2 | 6/2009 | Eick et al. |
| 7,661,271 B1 | 2/2010 | Millsaps, Jr. |
| 7,690,186 B2 | 4/2010 | Dooley |
| 7,770,377 B2 | 8/2010 | Rolt |
| 7,786,708 B2 | 8/2010 | Rozman et al. |
| 7,802,757 B2 | 9/2010 | Dooley et al. |
| 7,841,163 B2 | 11/2010 | Welch et al. |
| 7,952,221 B2 * | 5/2011 | Divito et al. .................. 307/9.1 |
| 8,492,915 B2 * | 7/2013 | Koeppen et al. ............ 290/36 R |
| 2002/0171005 A1 | 11/2002 | Claudet |
| 2004/0031880 A1 * | 2/2004 | Stemme et al. ................. 244/55 |
| 2008/0093850 A1 | 4/2008 | Taneja et al. |
| 2009/0007569 A1 | 1/2009 | Lemmers, Jr. et al. |
| 2009/0113871 A1 | 5/2009 | Certain |
| 2010/0058731 A1 | 3/2010 | Haehner et al. |
| 2010/0319357 A1 * | 12/2010 | Gazzino et al. ................. 60/778 |
| 2013/0139518 A1 | 6/2013 | Morgan |

* cited by examiner

STARTING OF AIRCRAFT ENGINE

TECHNICAL FIELD

The disclosure relates generally to aircraft engines, and more particularly to starting aircraft engines.

BACKGROUND OF THE ART

Twin-engine helicopters typically require both engines to operate at a relatively high power output during some phases of flight such as during take-off, for example. During other phases of flight such as cruise, power requirements may be significantly lower and therefore the power output from each engine may be significantly reduced. Even though only one of the two engines may be required during such other phases, it is typically required for safety reasons that both engines remain operating at all times during flight. In an emergency condition such as failure of one of the two engines, this allows the other engine to rapidly increase its power output to make up for the failed engine and take over. When the helicopter is at low altitude, it is imperative that the power output increase by the remaining engine be done as rapidly as possible.

When both engines of a dual-engine helicopter are operating at reduced power output, they are typically not operating within an optimum performance window of the engines. Consequently, depending on the type of mission, both engines of the helicopter operating at a reduced power output setting may operate at a relatively low fuel efficiency (i.e. relatively high fuel consumption) for relatively long portions of a flight.

Improvement is therefore desirable.

SUMMARY

The disclosure describes systems and methods for starting an engine of a multi-engine aircraft.

In various aspects, for example, the disclosure describes multi-engine gas turbine propulsion systems for helicopters. Such a system may for example comprise: a first gas turbine engine and a second gas turbine engine configured to drive a main rotor of the helicopter; an electric starter motor configured to assist starting of the first engine; an energy source configured to deliver electrical energy to the starter motor at a rapid rate during rapid starting of the first engine, the rapid rate being higher than a regular rate used during regular starting of the first engine; and an electric generator coupled to the second gas turbine engine and configured to convert energy from the second gas turbine engine into electrical energy to charge the energy source during operation of the second gas turbine engine.

In another aspect, the disclosure describes systems for rapidly starting engines of multi-engine aircraft. Such a system may for example comprise: a starter coupled to the aircraft engine and configured to assist starting of the aircraft engine; and an energy source configured to deliver energy to the starter at a rapid rate during rapid starting of the aircraft engine, the rapid rate being higher than a regular rate used during regular starting of the aircraft engine.

In a further aspect, the disclosure describes methods for driving devices on aircraft using multi-engine systems comprising at least first engine and second engines. Such a method may for example comprise: using one of the first and second engines to drive the device while the other of the first and second engines is in a shut-down state; rapidly starting the other of the first and second engines by delivering energy to the other of the first and second engines at a rapid delivery rate higher than a regular delivery rate used for regular starting; and using the other of the first and second engines to drive the device.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION OF THE PREFERRED EMBODIMENTS

Various aspects of preferred embodiments are described through reference to the drawings.

Figure 1:
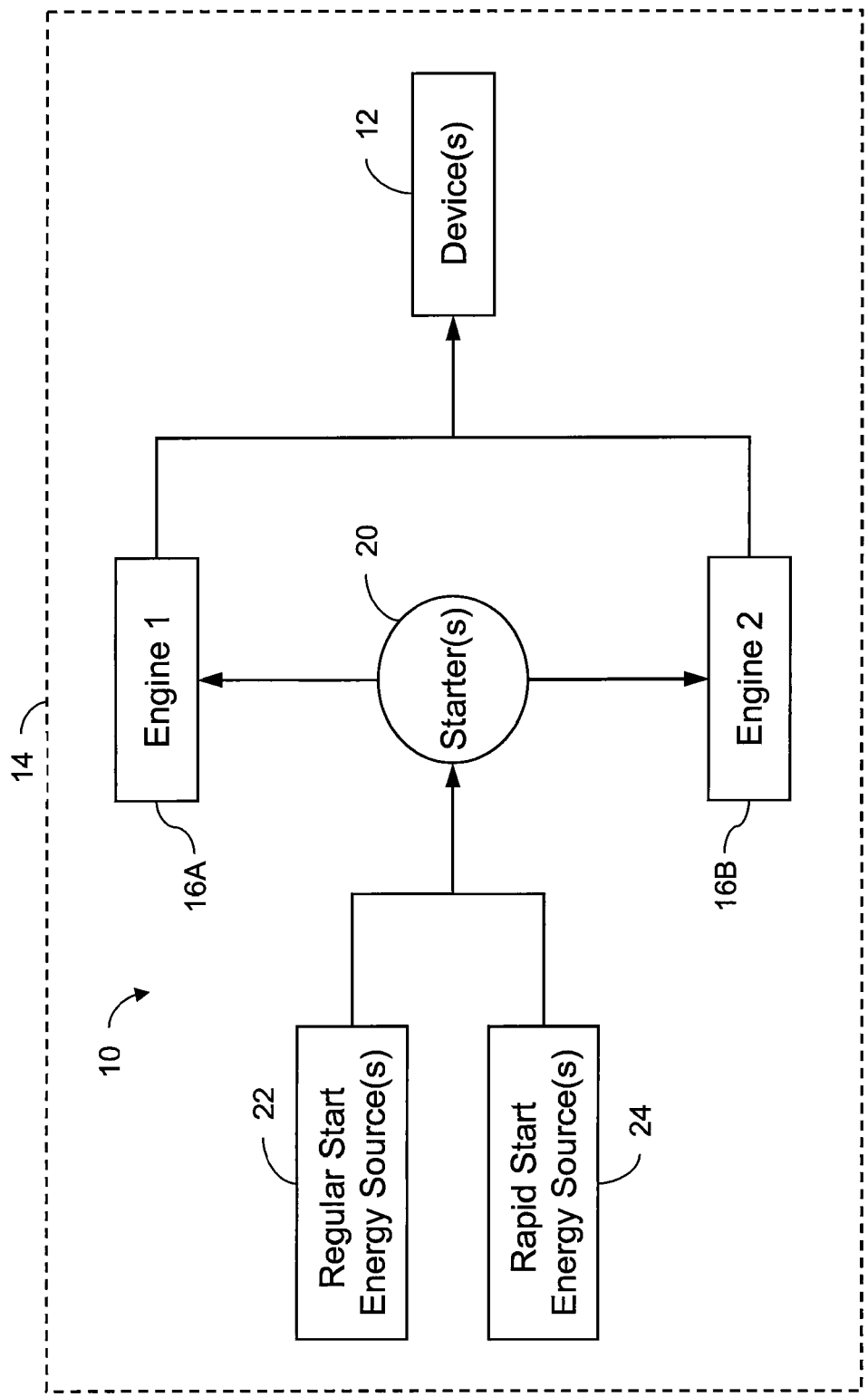
FIG. 1 is a schematic illustration of a multi-engine system for use in an aircraft.

FIG. 1 illustrates a multi-engine system, generally shown at 10, that may be used to power one or more device(s) 12 of aircraft 14. For example, aircraft 14 may be a helicopter or another type of aircraft. System 10 may comprise two or more engines 16A and 16B that may be configured to collectively and/or separately power device(s) 12. Suitable gearbox(es), not shown in FIG. 1, may be disposed between engines 16A, 16B and device(s) 12. For example, engines 16A, 16B may comprise one or more gas turbine engine(s) which may serve as a propulsion system for aircraft 14. Engines 16A, 16B and device(s) 12 may be engageable so that device(s) 12 may be driven by either first engine 16A, second engine 16B or by both first and second engines 16A, 16B simultaneously. Device(s) 12 may include, for example, one or more propeller(s), rotor(s), electric generator(s), pump(s), various mechanical or electrical loads and/or other aircraft accessories or loads.

System 10 may also comprise one or more starter(s) 20 that may be used to assist starting of at least one of engines 16A, 16B. Starter(s) 20 may be of conventional or other types. For example, starter(s) 20 may be in the form of an electrical motor or motor/generator. Starter(s) 20 and engines 16A, 16B may be configured such that a single starter 20 may be used to start both engines 16A, 16B either simultaneously or separately. Alternatively, each of engines 16A and 16B may have its own respective dedicated starter(s) 20. Starter(s) 20 may be powered by one or more energy sources 22, 24 capable of delivering energy at a regular rate during regular starting of one of engines 16A, 16B and delivering energy at a rapid rate during rapid starting of one of engines 16A, 16B.

The higher (rapid) rate at which energy may be delivered to starter(s) 20 during rapid starting, in comparison with regular starting, may correspond to a greater amount of power being delivered to starter(s) 20. In case of starter(s) 20 being one or more electric motor(s) for example, the rapid energy delivery rate may, in accordance with Joules Law ($P=V*I$), be achieved by delivering a larger current (I) to starter(s) 20 than is done during regular starting and/or by delivering the same or larger current (I) at a higher voltage (V). In case of starter(s) 20 being one or more air turbine(s) for example, the rapid energy delivery rate may be achieved by delivering a larger amount of air to starter(s) 20 per unit time in comparison with an amount of air per unit time delivered to starter(s) 20 during regular starting.

Energy sources 22, 24 may comprise separate energy source(s) 22 configured to deliver energy at a regular rate during regular starting and another energy source(s) 24 configured to deliver energy at a rapid rate during rapid starting. Alternatively, energy source(s) 22, 24, may comprise a single device, or multiple devices of a single type, configured to operate selectively in either of regular and high-energy modes. Thus, energy source(s) 22 and energy source(s) 24 may be of the same or different types.

For example, in a case where starter(s) 20 is/are of electric motor type, energy source(s) 22, used for regular starting, may include, for example, one or more battery(ies) as typically found on aircraft 14. Energy source(s) 24 may comprise one or more supercapacitors and may have a significantly higher power density than energy source(s) 22. It will be understood by one skilled in the relevant arts that a supercapacitor may also be known as supercondenser or ultracapacitor and that a supercapacitor may include, for example, an electrochemical capacitor with a relatively high energy density. A suitable type of supercapacitor that may be incorporated in energy source(s) 24 may be, for example, an electric double-layer capacitor (EDLC).

In comparison, the energy density of supercapacitors may be much greater than conventional electrolytic capacitors. Supercapacitors may also have a much higher power density than conventional batteries or fuel cells. Power density combines energy density with the speed at which the energy can be delivered to a load. For example, while a supercapacitor may typically not necessarily carry as much energy as a battery, energy from a supercapacitor may be delivered to a load at a much faster rate than energy from a battery. Also, supercapacitors may be charged and/or discharged at a rate that is typically faster than that of conventional batteries.

Alternatively, energy source(s) 22, 24 may comprise a single set of batteries and/or supercapacitors configured to operate at different output settings under normal and emergency or other rapid-start conditions.

Figure 2:
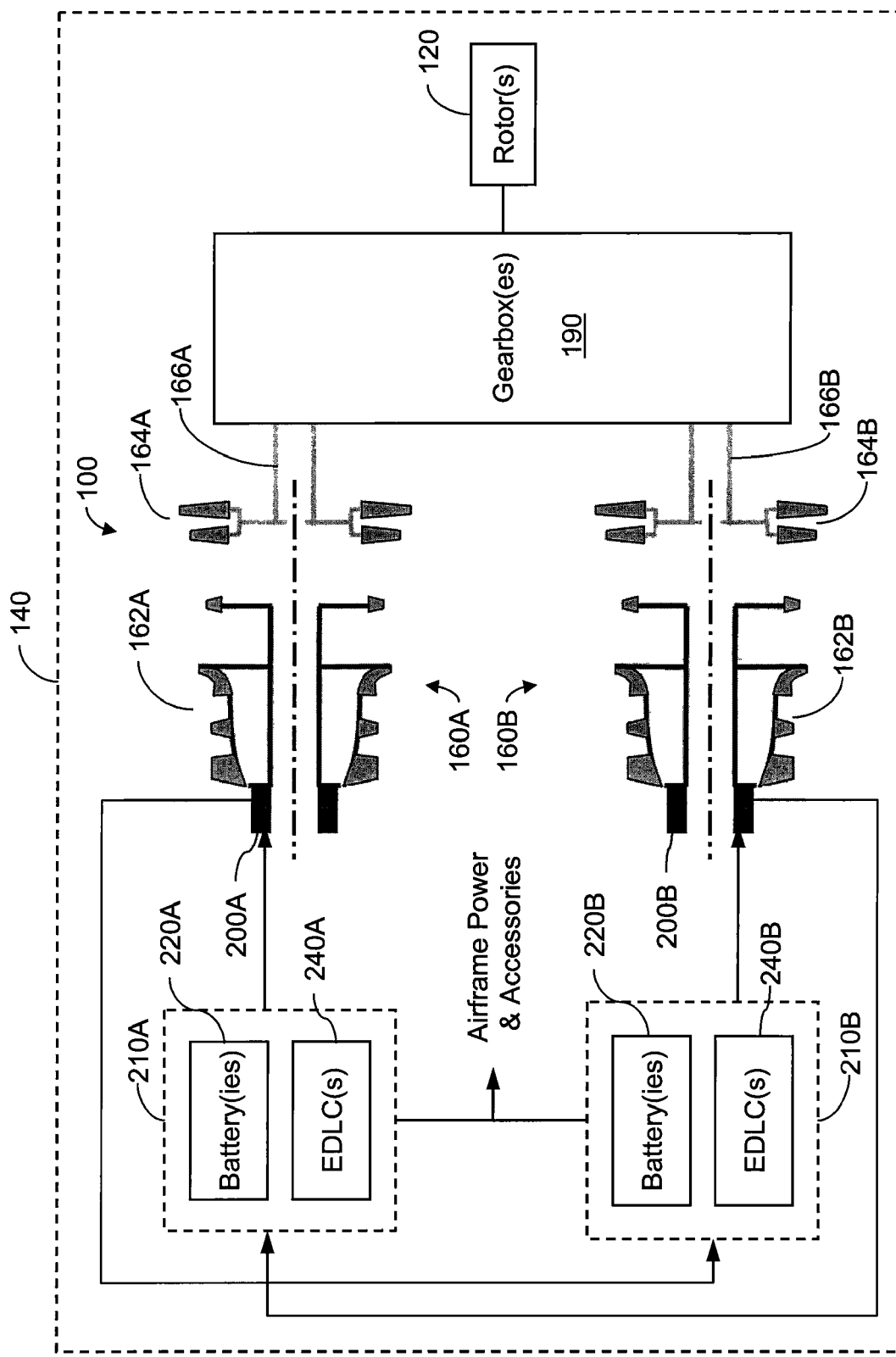
FIG. 2 is a schematic illustration of a multi-engine propulsion system for use in a helicopter.

FIG. 2 illustrates a multi-engine propulsion system, generally shown at 100, that may be used to power one or more rotor(s) 120 of helicopter 140. Similarly to system 10, system 100 may also comprise two or more engines 160A and 160B that may be configured to either collectively and/or separately power rotor(s) 120. For example, engines 160A, 160B may comprise one or more gas turbine engine(s). For example, engines 160A, 160B may be turboshaft engines configured to produce shaft power for driving rotor(s) 120 of helicopter 140. Engines 160A, 160B may each comprise high pressure spool(s) 162A, 162B comprising one or more compressor stages and low pressure spool(s) 164A, 164B comprising one or more turbines stages driving output shaft(s) 166A, 166B. Engines 160A, 160B and rotor(s) 120 may be engageable via suitable gearbox(es) 190 so that rotor(s) 120 may be driven by either first engine 160A, second engine 160B or by both first and second engines 160A, 160B simultaneously. Rotor(s) 120 may include, for example, one or more main rotors of helicopter 140 used for generating lift as well as forward/lateral forces for propelling helicopter 140. Rotor(s) 120 may also comprise one or more tail rotors. Other device(s) 12, 120 may also or alternatively be driven by engines 160A, 160B including one or more, electric generator(s), pump(s), various mechanical or electrical loads and/or other aircraft accessories or loads.

System 100 may also comprise one or more starter(s) 20, 200A, 200B that may be used to assist starting of at least one of engines 16, 160A, 160B. Starter(s) 200A may be provided for starting first engine 160A and starter(s) 200B may be provided for starting second engine 160B. Starter(s) 200A, 200B may be in the form of electrical motors/generators that may be used as motors during starting of engines and as generators during operation for converting mechanical energy from engines 160A, 160B into electrical energy to be used in various parts/systems of helicopter 140.

Starter(s) 200A, 200B may be powered by one or more energy sources 220A, 220B, 240A, 240B capable of delivering energy at a regular rate during regular starting of one of engines 160A, 160B and delivering energy at a rapid rate during rapid starting of one of engines 160A, 160B. Energy sources 220A, 220B, 240A, 240B may be incorporated into separate power control units 210A, 210B associated with each of engines 160A, 160B. For example, power control unit 210A may be associated with engine(s) 160A and comprise energy sources 220A and 240A. Power control unit 210B may be associated with engine(s) 160B and comprise energy sources 220B and 240B. Alternatively, energy sources 220A and 220B may be combined into a single regular start energy source such as energy source 22 shown in FIG. 1 and energy sources 240A and 240B may be combined into a single rapid start energy source such as energy source 24 shown in FIG. 1.

Energy sources 220A, 220B may comprise one or more conventional or other types of batteries that may be found on helicopter 140 and used to power various device(s)/accessory(ies) on helicopter 140 and also used for regular starting of engines 160A, 160B via starter/generators 200A, 200B respectively. Energy sources 220A, 220B may be rechargeable and may be charged using one or more of engines 160A, 160B. For example, energy source(s) 220A may be charged by engine 160B via starter/generator 200B and energy source(s) 220B may be charged by engine 160A via starter/generator 200A. An exemplary output voltage of energy source(s) 22, 220A, 220B may be 28 Volts.

As described above, rapid start energy source(s) 24, 240A, 240B may similarly comprise one or more supercapacitors. For example, energy source(s) 240A, 240B may each comprise one or more electric double-layer capacitors (EDLCs). Energy source(s) 240A, 240B may be used for rapid starting of engines 160A, 160B when required via starter/generators 200A, 200B respectively. Energy sources 240A, 240B may be rechargeable and may be charged using one or more of engines 160A, 160B. For example, energy source(s) 240A may be charged by engine 160B via starter/generator 200B and energy source(s) 240B may be charged by engine 160A via starter/generator 200A. An exemplary output voltage of energy source(s) 24, 240A, 240B may be 200 Volts. Hence, rapid start energy source(s) 24, 240A, 240B used to rapidly start one of engines 16A, 16B, 160A, 160B in the shut-down state may be charged by the other of engines 16A, 16B, 160A, 160B which is (or has been) operating.

During operation, engines 16A, 16B, 160A, 160B may be used to collectively and/or separately power various device(s) 12, 120 of aircraft 14, 140. During, for example, certain phases of flight of aircraft 14, 140 where a large amount of power may be required, such as take-off for example, both first engine(s) 16A, 160A and second engine(s) 16B, 160B may be required to be operated at a relatively high power output setting. However, during other phases of flight where a lower amount of power may be required, only one of first engine 16A, 160A and second engine 16B, 160B may be sufficient to provide the required amount of power. Accordingly, only one of first engine 16A, 160A and second engine 16B, 160B may be operated while the other of first engine 16A, 160A and second engine 16B, 160B may be in a shut-down state. Hence, the one of first engine 16A, 160A and second engine 16B, 160B may be operated at a higher power output level (e.g. closer to or within an optimum performance window) than it would otherwise if both first engine 16A, 160A and second engine 16B, 160B would be operating simultaneously at reduced power output levels. As a result, the operation of a single engine at a higher power output level may provide an overall better fuel efficiency (e.g. lower fuel consumption) and lower overall operating expenses than the operation of two engines at reduced power output levels.

For safety reasons, it may be required during operation of only one of first engine 16A, 160A and second engine 16B, 160B that the other of first engine 16A, 160A and second engine 16B, 160B have the ability to be re-started from the shut-down state and rapidly brought to a suitable or full power output level. Accordingly, in the event of an emergency such as a failure of the operating engine, the shut-down engine may have the ability to take over for the failed engine and prevent placing aircraft 14, 140 in a potentially catastrophic situation. The re-starting and power output increase of the shut-down engine should be done as rapidly as possible. The re-starting and power output increase of the shut-down engine may be initiated and controlled by a control system of aircraft 14, 140.

System 10, 100 may be used to assist the rapid starting of the one of first engine 16A, 160A and second engine 16B, 160B from a shut-down state during a single-engine operation. System 10, 100 may also be used to assist in rapidly increasing the power output of the one of first engine 16A, 160A and second engine 16B, 160B that has just been started after a successful light-off (e.g. start).

For example, system 10, 100 may be used to conduct a method comprising: using one of the first engine 16A, 160A and second engine 16B, 160B to drive device(s) 12, 120 while the other of the first engine 16A, 160A and second engine 16B, 160B is in a shut-down state; rapidly starting the other of the first engine 16A, 160A and second engine 16B, 160B by delivering energy to the other of the first engine 16A, 160A and second engine 16B, 160B at a rapid delivery rate higher than a regular delivery rate used for regular starting; and using the other of the first engine 16A, 160A and second engine 16B, 160B to drive device(s) 12, 120.

The energy used to rapidly start the one of the first engine 16A, 160A and second engine 16B, 160B may be provided by rapid start energy source(s) 24, 240A, 240B and may be delivered to the one of the first engine 16A, 160A and second engine 16B, 160B via appropriate starter(s) 20, 200A, 200B. The rate of energy delivery during rapid starting may be significantly higher than during regular starting of engines 16A, 16B, 160A, 160B using regular start energy source(s) 22, 220A, 220B. For example, the rate of energy delivery during rapid starting may be double or more the rate of energy delivery during regular starting. As will be understood by those skilled in the relevant arts, the rate of energy delivery during rapid starting may be determined, in whole or in part, by the characteristics of the engine(s) 16A, 16B, 160A, 160B to be restarted, with a goal being to deliver as much start-up energy as possible without destroying engine(s) 16A, 16B, 160A, 160B or components thereof, and thereby defeating the purpose. For example, using known aircraft engines, the rate of energy delivery may be six times the rate of energy delivery during regular starting, as that ratio in many cases will allow for at least a limited number of rapid starts without permanently impairing engine(s) 16A, 16B, 160A, 160B or components thereof. Accordingly, the starting time during rapid starting may, for example, be six times shorter than during regular starting. Those skilled in the relevant arts will understand that energy source(s) 24, 240A, 240B may be configured to deliver a suitable energy delivery rate based on specific needs and applications. As another example, the rapid energy delivery rate may be selected so that starter(s) 200A, 200B may deliver about ten times more power in comparison with regular starting.

Starter(s) 20, 200A, 200B may not necessarily require to be sized to continuously withstand loads (e.g. torques) associated with rapid starting. Instead, to reduce its weight and size, starter(s) 20, 200A, 200B may be liquid (e.g. oil) cooled and sized to only withstand rapid starting loads either on an intermittent basis (e.g. for relatively brief occurrences) or only a certain number of times before requiring inspection, maintenance and/or replacement. Since rapid starting may be used in emergency conditions (e.g. presumably rarely or never), it may be acceptable and appropriate to perform maintenance and/or replace starter(s) 20, 200A, 200B after such condition has occurred and rapid starting has been used.

Conditions which could potentially require rapid starting of the shut-down engine may include, for example, a sudden performance degradation and/or failure of the operating engine, which would likely require inspection and/or maintenance of the troubled/failed engine in any case. Rapid starting may also be used for an initial starting of one or more of engines 16A, 16B, 160A, 160B at the beginning of a flight/mission, if required, provided that a charge is available in rapid start energy source(s) 24, 240A, 240B. Rapid starting may also be used in a situation where an increase in power may suddenly become necessary and an additional engine may be brought in operation from a shut-down state in a relatively short period of time.

Alternatively, rapid starting may be done on a more frequent basis under normal or other operating conditions and starter(s) 20, 200A, 200B may be sized appropriately to withstand rapid starting loads/torques on a more frequent basis without necessarily requiring maintenance specifically due to rapid starting.

After rapidly starting (e.g. successful lighting off) of the one of first engine 16A, 160A and second engine 16B, 160B that was previously in a shut-down state, system 10, 100 may also be used to assist in increasing the power output of the one of first engine 16A, 160A and second engine 16B, 160B. During rapid starting, energy from rapid start energy source(s) 24, 240A, 240B may be delivered to starter(s) 20, 200A, 200B at a rapid rate and starter(s) 20, 200A, 200B may be used to increase a speed of high pressure spool(s) 162A, 162B to an optimum light-off speed. Once light-off has been achieved, starter(s) 20, 200A, 200B may be used to further increase a speed of the high pressure spool and, in conjunction with suitable fuel control to the engine, assist in reaching a desired power output level of engine(s) 16A, 16B, 160A, 160B in a relatively short time.

System 10, 100 may allow the operation of only one engine (or fewer engines than a total number of engines available) in a multi-engine (e.g. twin pack) system when desired for fuel savings in cruise or at other appropriate conditions while having the other (e.g. second) engine in a shut-down state but still available via rapid starting in case of an emergency condition. In a dual-engine system for example, engines 16A, 16B, 160A, 160B may be practically identical so that either one or both may be used to power aircraft 14, 140 under appropriate conditions and that each may be used alternatively to power aircraft 14, 140 while the other is in a shut-down state. The alternative shutting down of a different engine when appropriate during subsequent flights, for example, may be used to more evenly distribute usage between engines 16A, 16B, 160A, 160B.

The above description is meant to be exemplary only, and one skilled in the art will recognize that changes may be made to the embodiments described without departing from the scope of the invention disclosed. For example, while rapid starting of an engine is mainly described using one or more electric starters, it is apparent that other types of starters could also be used in conjunction with the embodiments described. Still other modifications which fall within the scope of the present invention will be apparent to those skilled in the art, in light of a review of this disclosure, and such modifications are intended to fall within the appended claims.

What is claimed is:

1. A system for rapidly starting an engine of a multi-engine aircraft, the system comprising:
   a first engine and a second engine operatively coupled to a rotor of the aircraft;
   an energy source comprising at least one supercapacitor; and
   a starter-generator in driving engagement with the first engine during regular starting of the first engine at a regular rate, in charging engagement with the energy source during operation of the first engine, and in driving engagement with the second engine during rapid starting of the second engine using the enemy source at a rapid rate higher than the regular rate.

2. The system as defined in claim 1, wherein the multi-engine aircraft is a twin-engine helicopter.

3. The system as defined in claim 1, wherein the energy source comprises at least one double-layer capacitor.

4. The system as defined in claim 1, wherein the rapid rate of energy delivery is at least double the regular rate of energy delivery.

5. The system as defined in claim 1, wherein the rapid rate of energy delivery is at least six times the regular rate of energy delivery.

6. A method for driving a device on an aircraft using a multi-engine system comprising at least a first engine and a second engine, the method comprising:
   using the first engine to drive the device while the second engine is in a shut-down state;
   charging an energy source comprising at least one supercapacitor using a starter-generator in driving engagement with the first engine during regular starting of the first engine at a regular rate and in charging engagement with the energy source during operation of the first engine while the second engine is in a shut-down state;
   rapidly starting the second engine using the starter-generator, by delivering energy from the energy source to the starter-generator at a rapid delivery rate higher than the regular rate used for the regular starting of the first engine; and
   using the second engine to drive the device.

7. The method as defined in claim 6, wherein the rapid delivery rate of energy delivery is at least double the regular rate of energy delivery.

8. The method as defined in claim 7, wherein the rapidly starting the second engine includes:
   increasing a compressor speed of the second engine to an optimum light-off speed; and
   once lit, further increasing the compressor speed to assist in reaching a desired power level of the second engine.

9. The method as defined in claim 6, wherein the energy source comprises at least one double-layer capacitor.

10. The method as defined in claim 6, wherein the rapidly starting of the second engine is done upon detection of an emergency condition.

11. The method as defined in claim 6, wherein the rapidly starting of the second engine is done upon detection of a performance degradation of the first engine.

12. The method as defined in claim 6, wherein the rapidly starting of the second engine is done upon detection of a failure of the first engine.

\* \* \* \* \*